United States Patent
Boni et al.

(10) Patent No.: US 11,061,951 B2
(45) Date of Patent: Jul. 13, 2021

(54) UNSUPERVISED ATTENTION BASED SCIENTIFIC DOCUMENT SUMMARIZATION

(71) Applicant: International Business Machines Corporation, Armonk, NY (US)

(72) Inventors: Odellia Boni, Giva'at Ela (IL); Doron Cohen, Gilon (IL); Guy Feigenblat, Givataym (IL); David Konopnicki, Haifa (IL); Haggai Roitman, Yoknea'm Elit (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/690,150

(22) Filed: Nov. 21, 2019

(65) Prior Publication Data

US 2021/0157829 A1 May 27, 2021

(51) Int. Cl.
*G06F 16/34* (2019.01)
*G06N 20/00* (2019.01)
*G06F 17/18* (2006.01)
*G06K 9/00* (2006.01)

(52) U.S. Cl.
CPC ............ *G06F 16/345* (2019.01); *G06F 17/18* (2013.01); *G06K 9/00469* (2013.01); *G06N 20/00* (2019.01)

(58) Field of Classification Search
CPC .................. G06K 9/00469; G06F 16/345
See application file for complete search history.

(56) References Cited

U.S. PATENT DOCUMENTS

| | | | | |
|---|---|---|---|---|
| 5,778,397 A * | 7/1998 | Kupiec | .................. | G06F 16/345 715/243 |
| 5,918,240 A * | 6/1999 | Kupiec | .................. | G06F 16/345 715/243 |
| 6,963,830 B1 * | 11/2005 | Nakao | .................. | G06F 16/345 704/1 |
| 7,725,442 B2 * | 5/2010 | Lin | ........................ | G06F 16/345 707/688 |
| 9,881,082 B2 | 1/2018 | Krishnamurthy et al. | | |
| 2002/0052901 A1 * | 5/2002 | Guo | ........................ | G06F 16/345 715/247 |
| 2007/0061356 A1 * | 3/2007 | Zhang | .................. | G06F 40/284 |
| 2008/0189074 A1 * | 8/2008 | Lin | ........................ | G06F 16/345 702/181 |

(Continued)

OTHER PUBLICATIONS

Praveen Dubey, Understand Text Summarization and create your own summarizer in python, Towards Data Science, Publication Date; Dec. 23, 2018, pp. 1-9.

(Continued)

*Primary Examiner* — Asher D Kells
(74) *Attorney, Agent, or Firm* — Gregory J. Kirsch

(57) ABSTRACT

Embodiments may provide automated summarization of documents, such as scientific documents by using a prior distribution on logical sections learnt from a corpus of human authored summaries. For example, a method of document summarization may comprise receiving, at the computer system, a document and segmenting the document into a plurality of sentences, identifying, at the computer system, sections in the document and aligning each sentence in the document to a section logical role, and summarizing, at the computer system, the document using a probability distribution.

12 Claims, 4 Drawing Sheets

| | |
|---|---|
| 202 | Abstract = ['abstract'] |
| 204 | Introduction = ['introduction', 'preface', 'motivation', 'background', 'justification'] |
| 206 | Related_work = ['related', 'history', 'literature', 'survey'] |
| 208 | Method = ['method', 'algorithm', 'approach', 'proposal', 'framework', 'technical'] |
| 210 | Results = ['result'] |
| 212 | Experiments = ['experiment', 'evaluation', 'setting', 'setup'] |
| 214 | Discussion = ['discussion', 'notes', 'advantage', 'analysis'] |
| 216 | Conclusions = ['conclusion', 'summary'] |
| 218 | Future_work = ['future'] |
| 220 | Unknown |

(56) References Cited

U.S. PATENT DOCUMENTS

2015/0339288 A1* 11/2015 Baker .................. G06F 40/166
                                                        704/9
2016/0357712 A1   12/2016 Zoon et al.
2017/0277668 A1    9/2017 Luo
2018/0365323 A1* 12/2018 Doornenbal .......... G06F 16/335
2019/0325066 A1* 10/2019 Krishna ................ G06F 16/313

OTHER PUBLICATIONS

Sandeep Sripada, et al., Summarization approaches based on document probability distributions, 23rd Pacific Asia Conference on Language, Information and Computation; Publication Year 2009; pp. 521-529.

Guy Feigenblat, et al., Unsupervised Query-Focused Multi-Document Summarization using the Cross Entropy Method; SIGIR '17, Aug. 7-11, 2017, Shinjuku, Tokyo, Japan; pp. 961-964.

* cited by examiner

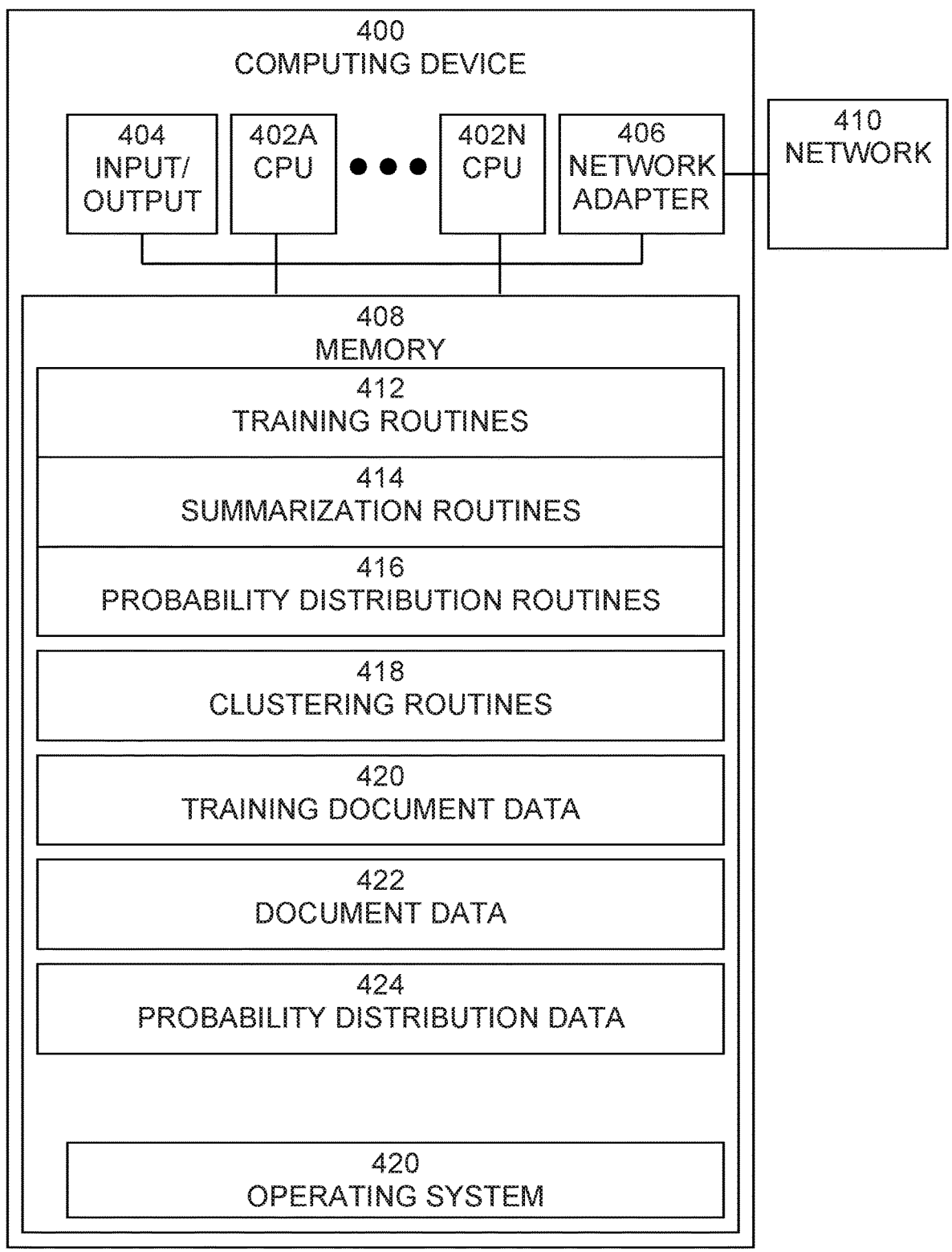

UNSUPERVISED ATTENTION BASED SCIENTIFIC DOCUMENT SUMMARIZATION

BACKGROUND

The present invention relates to techniques that generate a document summary, such as of a scientific document, by using a prior distribution on logical sections learnt from a corpus of human authored summaries.

Recent years have witnessed a boom in the amount of documents, such as scientific papers, being published in various online sources, such as PubMed, Google Scholar, WebOfScience, Microsoft Academic Search, etc. Trying to overcome the information overload, several online sources such as paper a day, The morning Paper, Marek Rei, TopBots, OpenReview, and ShortScience, now provide access to human authored summaries of selected works made by both experts and practitioners in their respective communities. Such human authored summaries are labor intensive and thus, expensive and time consuming to produce. Scientific documents have a complex structure as well as an intricate content, making their summarization a hard task even for humans.

A number of techniques for automatically generating summaries of scientific documents have been proposed. Compared to human authored summaries, existing automated techniques focus on automatic generation of relatively short summaries (around 250 words), which have an abstract-like structure. Moreover, many existing summarization methods rely on citations in order to pinpoint the important parts within a scientific document. However, for many newly published documents, which are typically the documents currently summarized by humans, the volume of citations in a document is not large enough to perform similar analysis.

Scientific documents are complicated both in content and structure, for example, sections. Such documents typically are long and a single document may cover a wide range of subjects. Further, the language models may be quite different, for example, between sections. For example, an Introduction section may use quite different language than an Experiments section.

Traditional document summarization techniques perform poorly on such long documents, due to low coverage caused by lack of ability to assign higher focus to more salient logical sections.

Accordingly, a need arises for techniques that provide automated summarization of complex documents, such as scientific documents that produces higher quality summaries with a reduction in human labor and expense.

SUMMARY

Embodiments may provide techniques that provide automated summarization of documents, such as scientific documents, which produces higher quality summaries with a reduction in human labor and expense. Embodiments may generate a document summary, such as of a scientific document, by using a prior distribution on logical sections learnt from a corpus of human authored summaries. Embodiments may be purely unsupervised with no parameter tuning. Such summarization techniques may produce a summary that more similar to a human authored summary, for example, in regards to how humans attend different logical section in their summary.

For example, in an embodiment, a method of document summarization may be implemented in a computer comprising a processor, memory accessible by the processor, and computer program instructions stored in the memory and executable by the processor, and the method may comprise receiving, at the computer system, a document and segmenting the document into a plurality of sentences, identifying, at the computer system, sections in the document and aligning each sentence in the document to a section logical role, and summarizing, at the computer system, the document using a probability distribution.

In embodiments, the probability distribution may be generated by receiving, at the computer system, a plurality of documents and segmenting the plurality of documents into a plurality of sentences, identifying, at the computer system, sections in the plurality of documents and aligning document sentences to similar sentences in a plurality of summaries, wherein each summary sentence is aligned to one document sentence, and generating, at the computer system, a probability distribution of summary sentences over section logical roles. The plurality of summaries may be generated by human authors. The probability distribution of summary sentences over section logical roles may comprise a prior probability distribution representing an average length of text in human authored summaries that is devoted to each role. Summarizing the document using the probability distribution may comprise receiving, at the computer system, the document, the prior probability distribution, and an upper bound on summary length, segmenting, at the computer system, the document into a plurality of sentences, and selecting, at the computer system, sentences from the plurality of sentences by iteratively sampling the sentences. The iterative sampling may use a Cross-Entropy method comprising initially assigning, at the computer system, each sentence with an equal uniform probability to be selected to the summary, iteratively generating, at the computer system, a plurality of summaries by sampling from a distribution over the plurality of sentences, evaluating, at the computer system, each generated summary using a target function measuring a plurality of summary quality objectives, and selecting, at the computer system, a summary based on the target function evaluation, wherein the target function comprises $Q_{CombMult}(S|\rho, D) = \Pi_{i=1}^{m} Q_i(S|\rho, D)$, wherein S is a set of sentences, $\rho$ is a prior distribution, D is an input set of documents, and i is a set of m different summary quality objectives. The iterative sampling may use a method comprising selected from a group of methods comprising a priors coverage objective method, which is a kl divergence between a prior distribution $\rho$ and a distribution of section roles in a generated summary, a mixed sampling method, in which each candidate is sampled from a mixed distribution, wherein a first distribution represents a general probability of a candidate sentence to be picked up independently of its section association based on Cross-Entropy probabilities, a second distribution is relative to $\rho$, and the mixture is controlled by a learnable parameter $\beta$, and an expectation maximization method.

In an embodiment, a system for document summarization may comprise a processor, memory accessible by the processor, and computer program instructions stored in the memory and executable by the processor to perform receiving a document and segmenting the document into a plurality of sentences, identifying sections in the document and aligning each sentence in the document to a section logical role, and summarizing the document using a probability distribution.

In an embodiment, a computer program product for document summarization may comprise a non-transitory computer readable storage having program instructions embodied therewith, the program instructions executable by a computer, to cause the computer to perform a method comprising receiving, at the computer system, a document and segmenting the document into a plurality of sentences, identifying, at the computer system, sections in the document and aligning each sentence in the document to a section logical role, and summarizing, at the computer system, the document using a probability distribution.

BRIEF DESCRIPTION OF THE DRAWINGS

The details of the present invention, both as to its structure and operation, can best be understood by referring to the accompanying drawings, in which like reference numbers and designations refer to like elements.

FIG. 4 is an exemplary block diagram of a computer system, in which processes involved in the embodiments described herein may be implemented.

DETAILED DESCRIPTION

Embodiments may provide techniques that provide automated summarization of documents, such as scientific documents, which produces higher quality summaries with a reduction in human labor and expense. Embodiments may generate a document summary, such as of a scientific document, by using a prior distribution on logical sections learnt from a corpus of human authored summaries. Embodiments may be purely unsupervised with no parameter tuning. Such summarization techniques may produce a summary that more similar to a human authored summary, for example, in regards to how humans attend different logical section in their summary.

Figure 1:
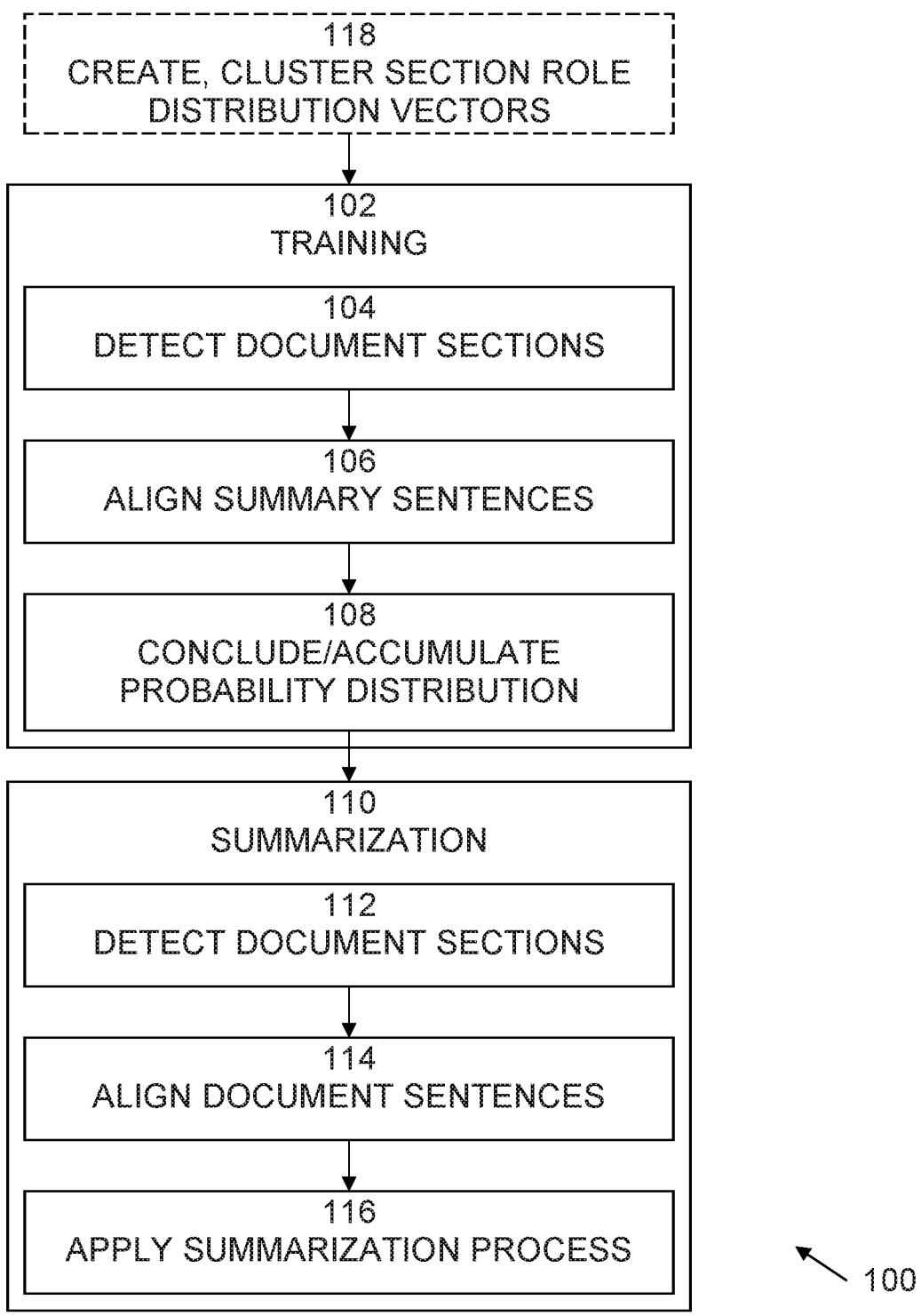
FIG. 1 exemplary flow diagram of a process according to embodiments of the present techniques.

An embodiment of a process 100 of operation according to the present systems and methods is shown in FIG. 1. Process 100 begins with training process 102, in which documents with labeled sections, and the corresponding human authored summaries for each document, may be processed. Scientific documents, for example, are usually structured into several logical sections that address various aspects of the reported underlying research work.

Figure 2:
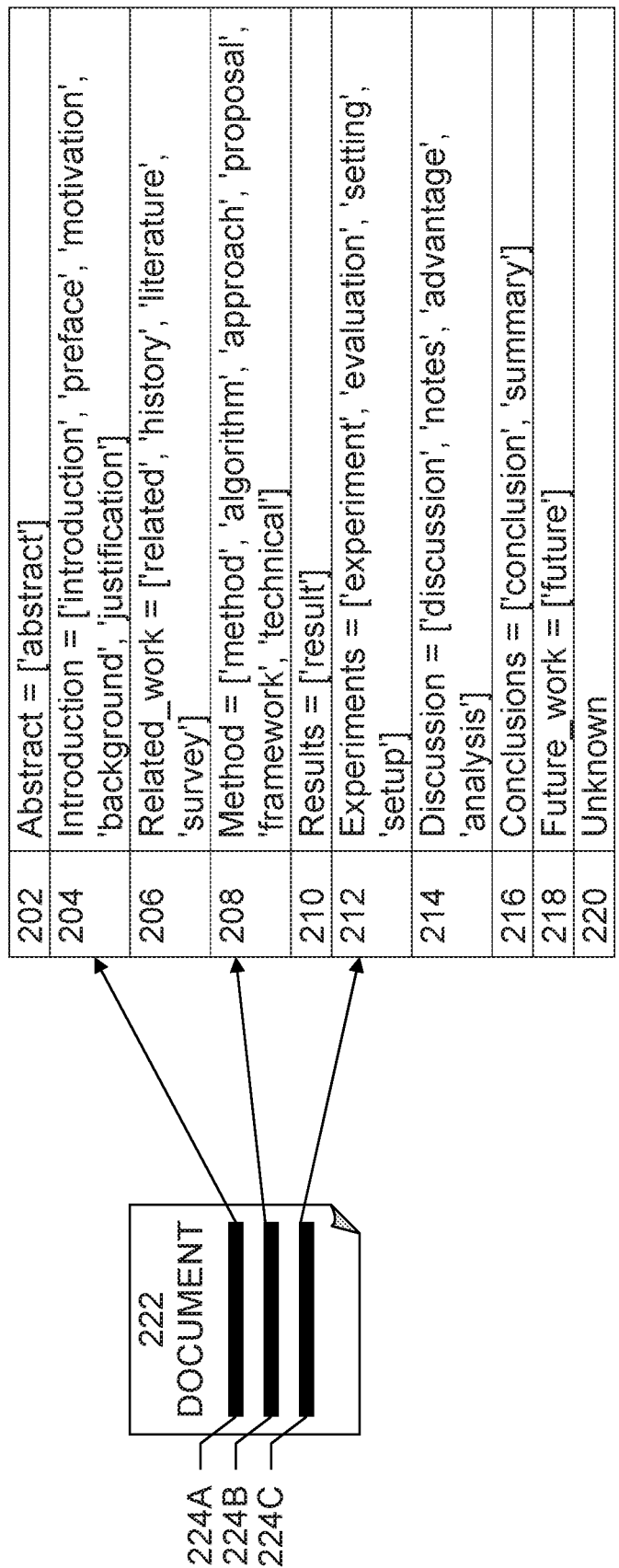
FIG. 2 is an exemplary diagram of sections roles that were identified based on section titles according to embodiments of the present techniques.

Training process 102 begins with 104, in which the labeled sections of each document being processed may be detected and identified. To determine to what extent human authored summaries cover logical aspects of the documents being summarized, each summary sentence may be aligned to its most probable section role in the original document. Examples of sections roles that were identified based on section titles are shown in FIG. 2. Such section roles may include Abstract 202, Introduction 204, Related work 206, Method 208, Results 210, Experiments 212, Discussion 214, Conclusions 216, Future work 218, and Unknown 220. FIG. 2 further shows a taxonomy of terms to assist with identifying logical sections in the documents. For example, an Abstract section may be identified by the term "abstract"; an Introduction section may be identified by the terms "introduction", "preface", "motivation", "background", "justification"; a Related work section may be identified by the terms "related", "history", "literature", "survey"; a Method section may be identified by the terms "method", "algorithm", "approach", "proposal", "framework", "technical"; a Results section may be identified by the term "result"; an Experiments section may be identified by the terms "experiment", "evaluation", "setting", "setup"; a Discussion section may be identified by the terms "discussion", "notes", "advantage", "analysis"; a Conclusions section may be identified by the terms "conclusion", "summary"; and a Future work section may be identified by the term "future". For example, in document 222, each sentence 224A-C may be assigned to a role 202-220.

At 106, each sentence in the corresponding human authored summaries for each document may be aligned with one sentence in the corresponding document. The alignment may be made based on the sentence or sentences in the document that is most similar to the sentence in the summary. Each human summary sentence may be aligned to the paper sentence most similar to it and may be assigned with the title of the section containing that paper section. If containing section title wasn't matched using the underlined taxonomy, the search may be propagated to a parent section. Examples of methods of determining similarity may include, for example, F1 ROUGE-L, average of F1 ROUGE-1, ROUGE-2, and ROUGE-L, and semantic similarity based on word embeddings vectors, such as Google News vectors.

At 108, a probability distribution of summary sentences over each section's logical role may be generated or accumulated to produce a prior probability distribution (p) representing the average length of text in human authored summaries which is devoted to the roles. Examples of results for different methods of determining similarity are shown in Table 1 below:

TABLE 1

| | | Summary sentences titles distribution with several similarity functions | | |
|---|---|---|---|---|
| Role | Section title distribution | ROUGE-L | Average ROUGE 1-2-L | Semantic |
| Experiments | 408 | 27.9% | 28.0% | 28.6% |
| Introduction | 537 | 28.3% | 28.5% | 28.2% |
| Method | 156 | 14.7% | 14.0% | 13.5% |
| Results | 156 | 8.3% | 8.7% | 9.4% |
| Related work | 268 | 9.7% | 9.2% | 8.3% |
| Discussion | 180 | 5.5% | 5.1% | 6.6% |
| Conclusions | 340 | 5.5% | 6.4% | 5.3% |
| Future work | 6 | 0.1% | 0.1% | 0.1% |

In embodiments, process 100 may include, for each section role, learning a function that maps the length of text devoted to this section role in an article to the length of text devoted to this section role in a summary. Now given a new article to summarize, this function may be applied in order to determine the length of text mapped to each section role in the summary, and this may be used in the summarization described above.

In embodiments, the amount of text devoted to each section role may be dependent on the type of article, for example, experimental vs. theoretical articles. Accordingly, process 100 may include 118, in which prior to 102, a vector of section role distribution may be created for each article and similar vectors may be clustered to create a target distribution for each cluster. Then, given an article to summarize, process 100 may determine to which cluster the article corresponds.

Process 100 continues with summarization process 110, in which new documents may be processed. At 112, the sections of each new document may be detected. At 114, each sentence in each new document may be aligned to a section logical role. At 116, a summarization process that uses a prior probability distribution over sentences, such as the probability distribution of summary sentences generated at 108, may be applied. Examples of such summarization processes may include, Summit, a CE based summarizer, described in the article by Guy Feigenblat, Haggai Roitman, Odellia Boni, and David Konopnicki, and entitled: Unsupervised Query-Focused Multi-Document Summarization using the Cross Entropy Method, published in SIGIR 2017: 961-964.

Figure 3:
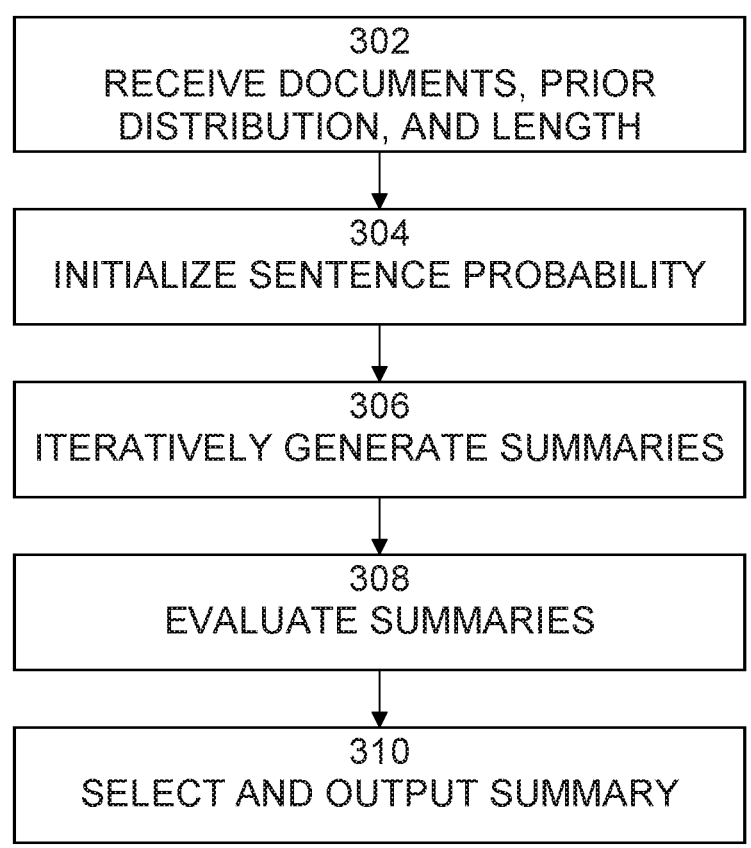
FIG. 3 is an exemplary flow diagram of a process according to embodiments of the present techniques.

Embodiments may extend a base process, such as that of Summit, for the summarization procedure with section prior distributions, as process 300, shown in FIG. 3. Process 300 may begin at 302, in which an input a set of documents D (which will then be segmented into sentences SD), a prior distribution p, and an upper bound on summary length (L) may be received. Sentences may be selected using an approach based on the Cross-Entropy method to sample from a distribution over SD iteratively. At 304, during initialization, each sentence may be assigned with an equal uniform probability to be selected to the summary (for example, assume 0.5 without loss of generality). At 306, a plurality of summaries may be iteratively generated. For example, in each iteration, process 300 may generate large number of summaries (for example, 10,000) by sampling from a distribution over SD. At 308, the generated summaries may be evaluated against a target function, for example, $Q_{CombMult}(S|\rho, D)$, which is combined of objectives, each measures m different summary quality objectives: $Q_{CombMult}(S|\rho, D)=\Pi_{i=1}^{m} Q_i (S|\rho, D)$. At 310, a set of sentences that represent a length compliant summary to the query may be selected based on the target function evaluation, and the set of sentences may be output.

In embodiments, there may be different ways in which the section prior distribution may be utilized. In embodiments, a priors coverage objective may be used. The priors coverage objective may be defined as the kl divergence between a prior distribution $\rho$ and the distribution of section roles in a generated summary. To calculate the distribution of section roles, an approach similar to that described above may be used.

In embodiments, mixed sampling may be used. In mixed sampling, each candidate may be sampled from a mixed distribution. The first distribution may represent the general probability of a candidate sentence to be picked up independently of its section association, for example, based on the Cross-Entropy probabilities. The second distribution may relative to $\rho$. The mixture may be controlled by an additional learnable parameter $\beta$. There are several options how to learn such a parameter. For example, the Cross-Entropy method itself may be used for learning an optimal mixed distribution by learning $\beta$. As another example, a process such as Expectation Maximization (EM) can be utilized.

An exemplary block diagram of a computer system 400, in which processes involved in the embodiments described herein may be implemented, is shown in FIG. 4. Computer system 400 may be implemented using one or more programmed general-purpose computer systems, such as embedded processors, systems on a chip, personal computers, workstations, server systems, and minicomputers or mainframe computers, or in distributed, networked computing environments. Computer system 400 may include one or more processors (CPUs) 402A-402N, input/output circuitry 404, network adapter 406, and memory 408. CPUs 402A-402N execute program instructions in order to carry out the functions of the present communications systems and methods. Typically, CPUs 402A-402N are one or more microprocessors, such as an INTEL CORE® processor. FIG. 4 illustrates an embodiment in which computer system 400 is implemented as a single multi-processor computer system, in which multiple processors 402A-402N share system resources, such as memory 408, input/output circuitry 404, and network adapter 406. However, the present communications systems and methods also include embodiments in which computer system 400 is implemented as a plurality of networked computer systems, which may be single-processor computer systems, multi-processor computer systems, or a mix thereof.

Input/output circuitry 404 provides the capability to input data to, or output data from, computer system 400. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 406 interfaces device 400 with a network 410. Network 410 may be any public or proprietary LAN or WAN, including, but not limited to the Internet.

Memory 408 stores program instructions that are executed by, and data that are used and processed by, CPU 402 to perform the functions of computer system 400. Memory 408 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 408 may vary depending upon the function that computer system 400 is programmed to perform. In the example shown in FIG. 4, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In the example shown in FIG. 4, memory 408 may include training routines 412, summarization routines 414, probability distribution routines 416, clustering routines 418, training document data 420, document data 422, probability distribution data 424, and operating system 420. Training routines 412 may include software routines to generate probability distribution data 424 from training document data 420, as described above. Summarization routines 414 may include software routines to generate summaries of document data 422, as described above. Probability distribution routines 416 may include software routines to generate probability distribution data 424, as described above. Clustering routines 418 may include software routines to generate section role distribution vectors and clusters forming target distributions, as described above. Operating system 420 may provide overall system functionality.

As shown in FIG. 4, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of document summarization, implemented in a computer comprising a processor, memory accessible by the processor, and computer program instructions stored in the memory and executable by the processor, the method comprising:
   receiving, at the computer system, a document and segmenting the document into a plurality of sentences;
   identifying, at the computer system, sections in the document and aligning each sentence in the document to a section logical role; and
   summarizing, at the computer system, the document using a probability distribution;
   wherein the probability distribution is generated by:
   receiving, at the computer system, a plurality of documents and segmenting the plurality of documents into a plurality of sentences;
   identifying, at the computer system, sections in the plurality of documents and aligning document sentences to similar sentences in a plurality of summaries, wherein each summary sentence is aligned to one document sentence; and
   generating, at the computer system, a probability distribution of summary sentences over section logical roles; and
   wherein the probability distribution of summary sentences over section logical roles comprises a prior probability distribution representing an average length of text in human authored summaries that is devoted to each role.

2. The method of claim 1, wherein summarizing the document using the probability distribution comprises:
   receiving, at the computer system, the document, the prior probability distribution, and an upper bound on summary length;
   segmenting, at the computer system, the document into a plurality of sentences; and
   selecting, at the computer system, sentences from the plurality of sentences by iteratively sampling the sentences.

3. The method of claim 2, wherein the iterative sampling uses a Cross-Entropy method comprising:
   initially assigning, at the computer system, each sentence with an equal uniform probability to be selected to the summary;
   iteratively generating, at the computer system, a plurality of summaries by sampling from a distribution over the plurality of sentences;
   evaluating, at the computer system, each generated summary using a target function measuring a plurality of summary quality objectives; and
   selecting, at the computer system, a summary based on the target function evaluation, wherein the target function comprises $Q_{CombMult}(S|\rho, D) = \Pi_{i=1}^{m} Q_i (S|\rho, D)$, wherein S is a set of sentences, $\rho$ is a prior distribution, D is an input set of documents, and i is a set of m different summary quality objectives.

4. The method of claim 2, wherein the iterative sampling uses a method comprising selected from a group of methods comprising:
   a priors coverage objective method, which is a kl divergence between a prior distribution $\rho$ and a distribution of section roles in a generated summary;
   a mixed sampling method, in which each candidate is sampled from a mixed distribution, wherein a first distribution represents a general probability of a candidate sentence to be picked up independently of its section association based on Cross-Entropy probabilities, a second distribution is relative to $\rho$, and the mixture is controlled by a learnable parameter $\beta$; and
   an expectation maximization method.

5. A system for document summarization, the system comprising a processor, memory accessible by the processor, and computer program instructions stored in the memory and executable by the processor to perform:
   receiving a document and segmenting the document into a plurality of sentences;
   identifying sections in the document and aligning each sentence in the document to a section logical role; and
   summarizing the document using a probability distribution;
   wherein the probability distribution is generated by:
   receiving a plurality of documents and segmenting the plurality of documents into a plurality of sentences;
   identifying sections in the plurality of documents and aligning document sentences to similar sentences in a plurality of summaries, wherein each summary sentence is aligned to one document sentence; and
   generating a probability distribution of summary sentences over section logical roles; and
   wherein the probability distribution of summary sentences over section logical roles comprises a prior probability distribution representing an average length of text in human authored summaries that is devoted to each role.

6. The system of claim 5, wherein summarizing the document using the probability distribution comprises:

receiving, at the computer system, the document, the prior probability distribution, and an upper bound on summary length;

segmenting, at the computer system, the document into a plurality of sentences; and selecting, at the computer system, sentences from the plurality of sentences by iteratively sampling the sentences.

7. The system of claim 6, wherein the iterative sampling uses a Cross-Entropy method comprising:

initially assigning, at the computer system, each sentence with an equal uniform probability to be selected to the summary;

iteratively generating, at the computer system, a plurality of summaries by sampling from a distribution over the plurality of sentences;

evaluating, at the computer system, each generated summary using a target function measuring a plurality of summary quality objectives; and selecting, at the computer system, a summary based on the target function evaluation, wherein the target function comprises $Q_{CombMult}(S|\rho, D) = \Pi_{i=1}^{m} Q_i(S|\rho, D)$, wherein S is a set of sentences, $\rho$ is a prior distribution, D is an input set of documents, and i is a set of m different summary quality objectives.

8. The system of claim 6, wherein the iterative sampling uses a method comprising selected from a group of methods comprising:

a priors coverage objective method, which is a kl divergence between a prior distribution $\rho$ and a distribution of section roles in a generated summary;

a mixed sampling method, in which each candidate is sampled from a mixed distribution, wherein a first distribution represents a general probability of a candidate sentence to be picked up independently of its section association based on Cross-Entropy probabilities, a second distribution is relative to $\rho$, and the mixture is controlled by a learnable parameter $\beta$; and an expectation maximization method.

9. A computer program product for document summarization, the computer program product comprising a non-transitory computer readable storage having program instructions embodied therewith, the program instructions executable by a computer, to cause the computer to perform a method comprising:

receiving, at the computer system, a document and segmenting the document into a plurality of sentences;

identifying, at the computer system, sections in the document and aligning each sentence in the document to a section logical role; and summarizing, at the computer system, the document using a probability distribution;

wherein the probability distribution is generated by:

receiving, at the computer system, a plurality of documents and segmenting the plurality of documents into a plurality of sentences;

identifying, at the computer system, sections in the plurality of documents and aligning document sentences to similar sentences in a plurality of summaries, wherein each summary sentence is aligned to one document sentence; and generating, at the computer system, a probability distribution of summary sentences over section logical roles; and wherein the probability distribution of summary sentences over section logical roles comprises a prior probability distribution representing an average length of text in human authored summaries that is devoted to each role.

10. The computer program product of claim 9, wherein summarizing the document using the probability distribution comprises:

receiving, at the computer system, the document, the prior probability distribution, and an upper bound on summary length;

segmenting, at the computer system, the document into a plurality of sentences; and selecting, at the computer system, sentences from the plurality of sentences by iteratively sampling the sentences.

11. The computer program product of claim 10, wherein the iterative sampling uses a Cross-Entropy method comprising:

initially assigning, at the computer system, each sentence with an equal uniform probability to be selected to the summary;

iteratively generating, at the computer system, a plurality of summaries by sampling from a distribution over the plurality of sentences;

evaluating, at the computer system, each generated summary using a target function measuring a plurality of summary quality objectives; and selecting, at the computer system, a summary based on the target function evaluation, wherein the target function comprises $Q_{CombMult}(S|\rho, D) = \Pi_{i=1}^{m} Q_i(S|\rho, D)$, wherein S is a set of sentences, $\rho$ is a prior distribution, D is an input set of documents, and i is a set of m different summary quality objectives.

12. The computer program product of claim 10, wherein the iterative sampling uses a method comprising selected from a group of methods comprising:

a priors coverage objective method, which is a kl divergence between a prior distribution $\rho$ and a distribution of section roles in a generated summary;

a mixed sampling method, in which each candidate is sampled from a mixed distribution, wherein a first distribution represents a general probability of a candidate sentence to be picked up independently of its section association based on Cross-Entropy probabilities, a second distribution is relative to $\rho$, and the mixture is controlled by a learnable parameter $\beta$; and an expectation maximization method.

* * * * *